(12) United States Patent
Johnson et al.

(10) Patent No.: US 7,100,076 B2
(45) Date of Patent: Aug. 29, 2006

(54) MINIMUM LATENCY REINSTATEMENT OF DATABASE TRANSACTION LOCKS

(75) Inventors: Charles S. Johnson, San Jose, CA (US); David C. Hege, San Jose, CA (US); Gary S. Smith, Auburn, CA (US); Ronald M. Cassou, Palo Alto, CA (US); Sang-Sheng Tung, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 705 days.

(21) Appl. No.: 10/435,115

(22) Filed: May 9, 2003

(65) Prior Publication Data
US 2004/0225915 A1 Nov. 11, 2004

(51) Int. Cl.
*G06F 11/00* (2006.01)
*G06F 7/00* (2006.01)
*G06F 9/46* (2006.01)

(52) U.S. Cl. ............... 714/13; 714/11; 707/8; 718/101

(58) Field of Classification Search ............ 714/13
See application file for complete search history.

(56) References Cited

U.S. PATENT DOCUMENTS

| 5,561,795 | A | * | 10/1996 | Sarkar | 707/202 |
| 5,966,706 | A | * | 10/1999 | Biliris et al. | 707/10 |
| 6,052,695 | A | * | 4/2000 | Abe et al. | 707/202 |
| 6,105,147 | A | * | 8/2000 | Molloy | 714/16 |
| 6,145,094 | A | * | 11/2000 | Shirriff et al. | 714/11 |
| 6,301,676 | B1 | * | 10/2001 | Kumar et al. | 714/11 |
| 6,338,146 | B1 | * | 1/2002 | Johnson et al. | 714/4 |
| 7,028,219 | B1 | * | 4/2006 | Johnson et al. | 714/15 |
| 2004/0199812 | A1 | * | 10/2004 | Earl et al. | 714/13 |
| 2005/0187891 | A1 | * | 8/2005 | Johnson et al. | 707/1 |

OTHER PUBLICATIONS

Molesky, Lory D. and Ramamritham, Krithi, Recovery Protocols for Shared Memory Database Systems, 1995, International Conference on Management of Data: Proceedings of the 1995 ACM SIGMOD International conference on Management of data, San Jose, CA, pp. 11-22.*

* cited by examiner

*Primary Examiner*—Robert Beausoliel
*Assistant Examiner*—Christopher McCarthy

(57) ABSTRACT

A method of transferring a transaction workload of a primary process pair. The primary pair has access to a stable storage volume for storing data items and a log for storing transaction processing updates to data items. A backup process pair is established for the primary pair and information is transferred thereto so that it can take over for the primary pair should that pair fail. Additionally, a lock table is maintained and update records are written to the log by the primary pair. The update records include any locks from the lock table that related to the update records. When a failure of the primary pair occurs, the storage volume is locked, and the backup pair reads the log to reconstruct a lock table. Once the locks have been reconstructed, the lock on the storage volume is released and the backup pair operates to process the workload.

7 Claims, 16 Drawing Sheets constellation 18

Typical Log Entries

- Update record (100)
  - TxID
  - DB_Location (page-ID)
  - Offset
  - Length
  - before_image
  - after_image
  - pointer to VSN of prev update record (NULL if first)
- Commit Record (102)
  - TxID
- Abort Record (104)
  - TxID
- Checkpoint Record (106)
  - list of active transactions at checkpoint time
  - List of data items in dirty cache slots and VSNs in stable storage of these slots at time of checkpoint

FIG. 3

MINIMUM LATENCY REINSTATEMENT OF DATABASE TRANSACTION LOCKS

CROSS-REFERENCE TO RELATED APPLICATIONS

This application is related to and incorporates by reference:

U.S. Pat. No. 6,338,146, issued Jan. 8, 2002, entitled "Method and Apparatus for Fault-Tolerant, Scalable and Non-Blocking Three-Phase Flushing for Committing Database Transactions in a Cluster of Multiprocessors"; as well as:

U.S. patent application Ser. No. 10/095,996, filed Mar. 8, 2002, entitled "Using Process Quads to Enable Continuous Services in a Cluster Environment";

U.S. application Ser. No. 09/872,323, filed Jun. 1, 2001, entitled "System and Method for Replication of Distributed Databases that Span Multiple Primary Nodes"; and U.S. application Ser. No. 10/774,267, filed Feb. 6, 2004, entitled "Transaction Processing Apparatus and Method".

FIELD

This invention relates generally to a fault-tolerant cluster, and more particularly to the reinstatement of locks after a cluster failure so that another available cluster in constellation of clusters can begin processing the transaction workload of the failed cluster.

BACKGROUND

Currently, large transaction processing systems are distributed systems formed from a plurality of clusters interconnected by a network called an external switching fabric 36. FIG. 1A shows such a plurality of clusters 10, 12, 14, 16, which is also called a constellation 18. Clusters 10–16 are so designated because they comprise nodes interconnected by an internal switching fabric 20, 22, 24, 26. Each node 28a–c, 30a–c, 32a–c, of a cluster is a server unit that includes processing units and controllers that enable a processing unit to access stable (non-volatile storage). Stable storage is storage that survives a failure of the processing unit. A processing unit includes a central processor and memory, each independent of the other processing units, such that a failure of one processing unit does not cause a failure of another processing unit. The memory of each processing unit is dedicated to the central processor of the processing unit. That is, the memory is not shared by other processing units.

FIG. 1B is a block diagram of an exemplary cluster 10, 12, 14, 16 with three processing unit pairs 40a–b, 42a–b, 44a–b, each processing unit being connected to pair of interprocessor buses 46, 48 that constitute the internal switching fabric 20 of the cluster, though other numbers of processing units and other types and numbers of buses are possible. Each processing unit pair 40a–b, 42a–b, 44a–b is connected to a corresponding controller pair 50a–b, 52a–b, 54a–b to have redundant access to the device controlled by the controller. Controller pair 50a–b is connected to storage volumes 56a–b and controller pair 54a–b is connected to storage volumes 58a–b, while controller pair 52a–b is connected to a communications unit 60. Storage volumes 56a–b, 58a–b are not required to be physically present in the cluster. In some embodiments, the storage volumes are part of a large storage system to which each of the processing units has access.

A cluster 10, 12, 14, 16, as shown in FIG. 1, can become inoperable or become inaccessible for a period of time. Inaccessibility can occur when software operating on the cluster must undergo a major overhaul or if there is a communication failure in the external switching fabric 36 that isolates a cluster from the other clusters in the constellation 18. When such a failure occurs, it is desirable to make the cluster failure relatively unobservable to the users of the system. One solution is to have a spare system that acts as a hot standby to the failed cluster. However, this is exceedingly expensive if the inoperable or inaccessible cluster is large.

Thus, there is a need for an improved system and method for handling cluster inoperability or inaccessibility without a hot standby. Often, if a locking scheduler is used to schedule transactions, the locks held by the transactions in the workload can be an impediment to handling cluster inoperability or inaccessibility. The locks are used to preserve the consistency of the database and lack of knowledge of which locks are set if a failure occurs can jeopardize the consistency of the database if processing which affects the database continues.

SUMMARY

The present invention is directed towards an improved system and method for handling cluster inoperability or inaccessibility. A method in accordance with the present invention includes a method of transferring a transaction processing workload of a primary process pair, where the primary process pair has access to a stable storage volume for storing data items and a sequential log for storing transaction processing updates to data items. The method includes establishing a backup process pair for the primary process pair. While processing the transaction workload of the primary processing pair, information is transferred from the primary process pair to the backup process pair, such that the backup process pair can takeover the workload of the primary processing pair if the primary process pair is not available to process the workload. Also during the processing of the transaction workload by the primary pair, a lock table is maintained, the entries of which indicate data items of the storage volume that are locked by transactions of the transaction processing workload. In one embodiment, the data items are table records and the locks are record locks. Upon updating a data item in stable storage, update records are written to a log on the stable storage volume. These update records in the log include lock information relating to the update record. Upon a failure of the primary process pair, processing of the workload is transferred to the backup process pair and the stable storage volume is locked. The log in stable storage is then read to obtain the lock information contained therein and a lock table is reconstructed for the backup process pair from the lock information read from the log. The lock on the stable storage volume is then released so that the backup pair can continue processing of the transaction processing workload using the reconstructed lock table.

One advantage of the present invention is that there is minimal interruption of the transaction system for the users.

Another advantage is that the lock on the storage volume does not last for a long time while the transaction system prepares the backup pair for processing the workload.

Yet another advantage is that database consistency is preserved during the takeover process because the lock table is reconstructed for the backup pair. This assures that the locks that were held to assure serializability and recovery of the database while the primary pair was processing the workload are present when the backup pair processes the workload.

BRIEF DESCRIPTION OF THE DRAWINGS

These and other features, aspects and advantages of the present invention will become better understood with regard to the following description, appended claims, and accompanying drawings where:

FIG. 3 is an illustration of a write-ahead log;

DETAILED DESCRIPTION

The system and method of the present invention are configured to have the other clusters in a constellation take over for the failed cluster. However, several problems must be handled for this to occur successfully.

Figure 1A:
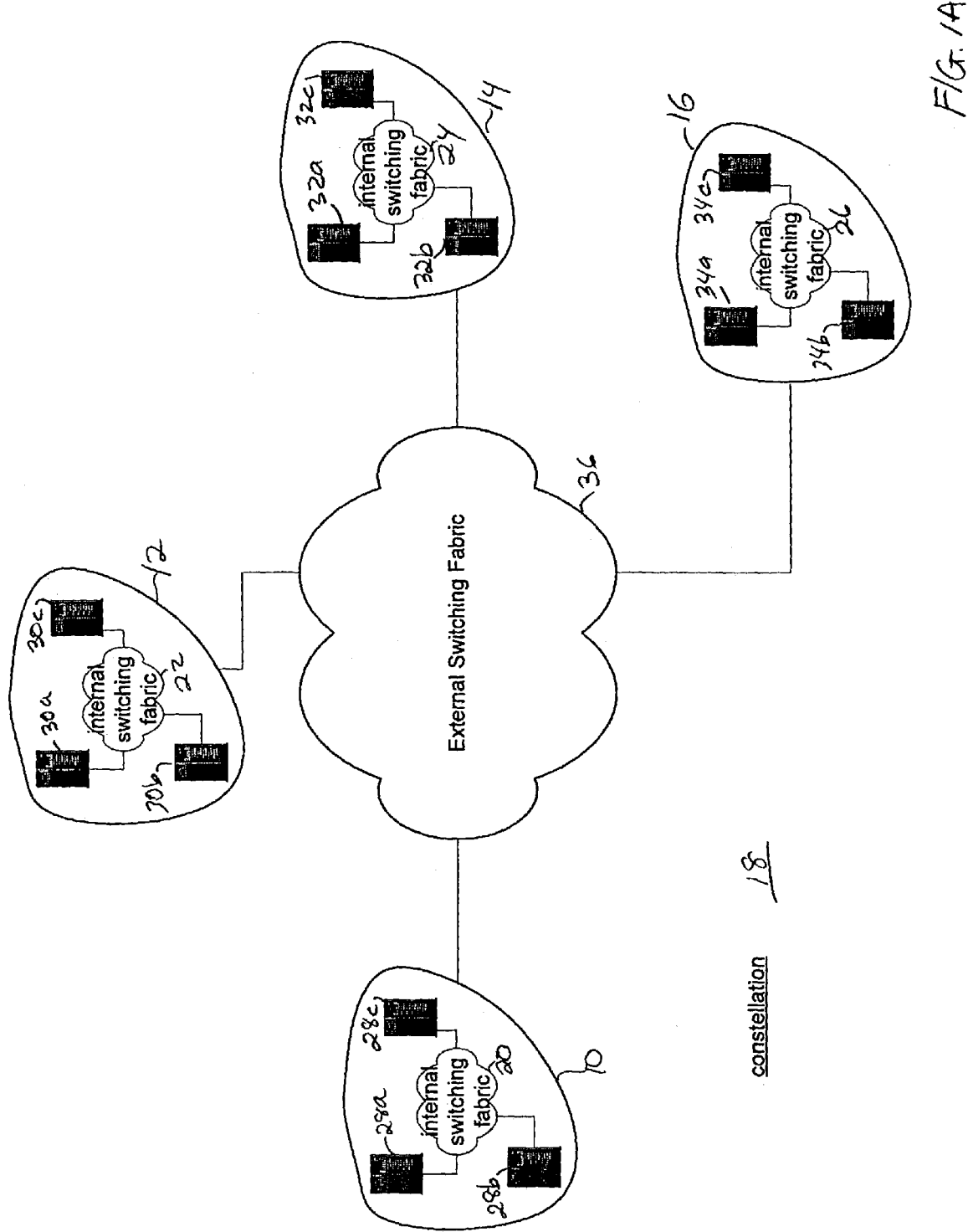
FIG. 1A is a plurality of clusters (i.e., a constellation) in an embodiment of the present invention.
Figure 1B:
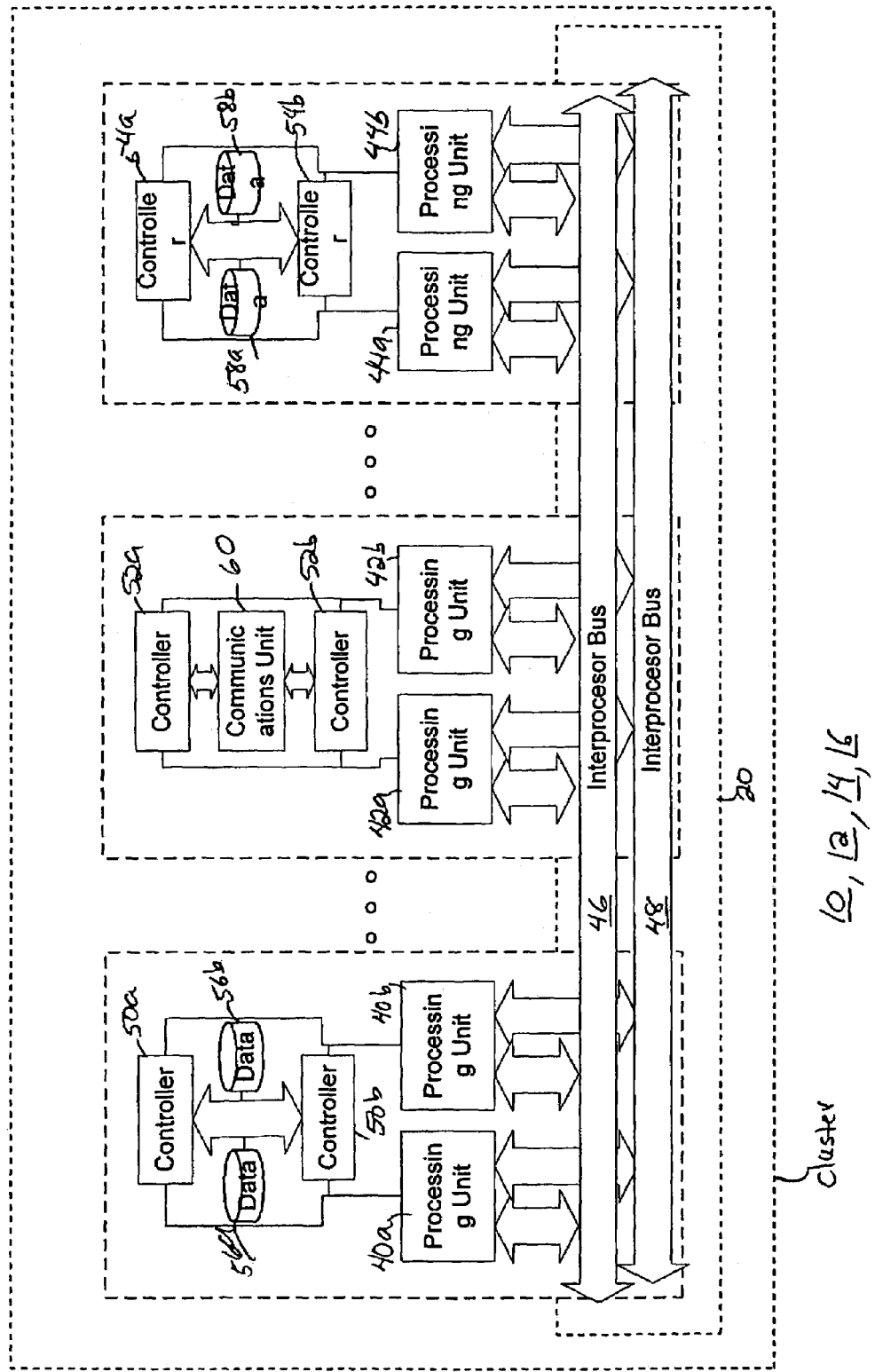
FIG. 1B is a block diagram of an exemplary cluster.
Figure 2:
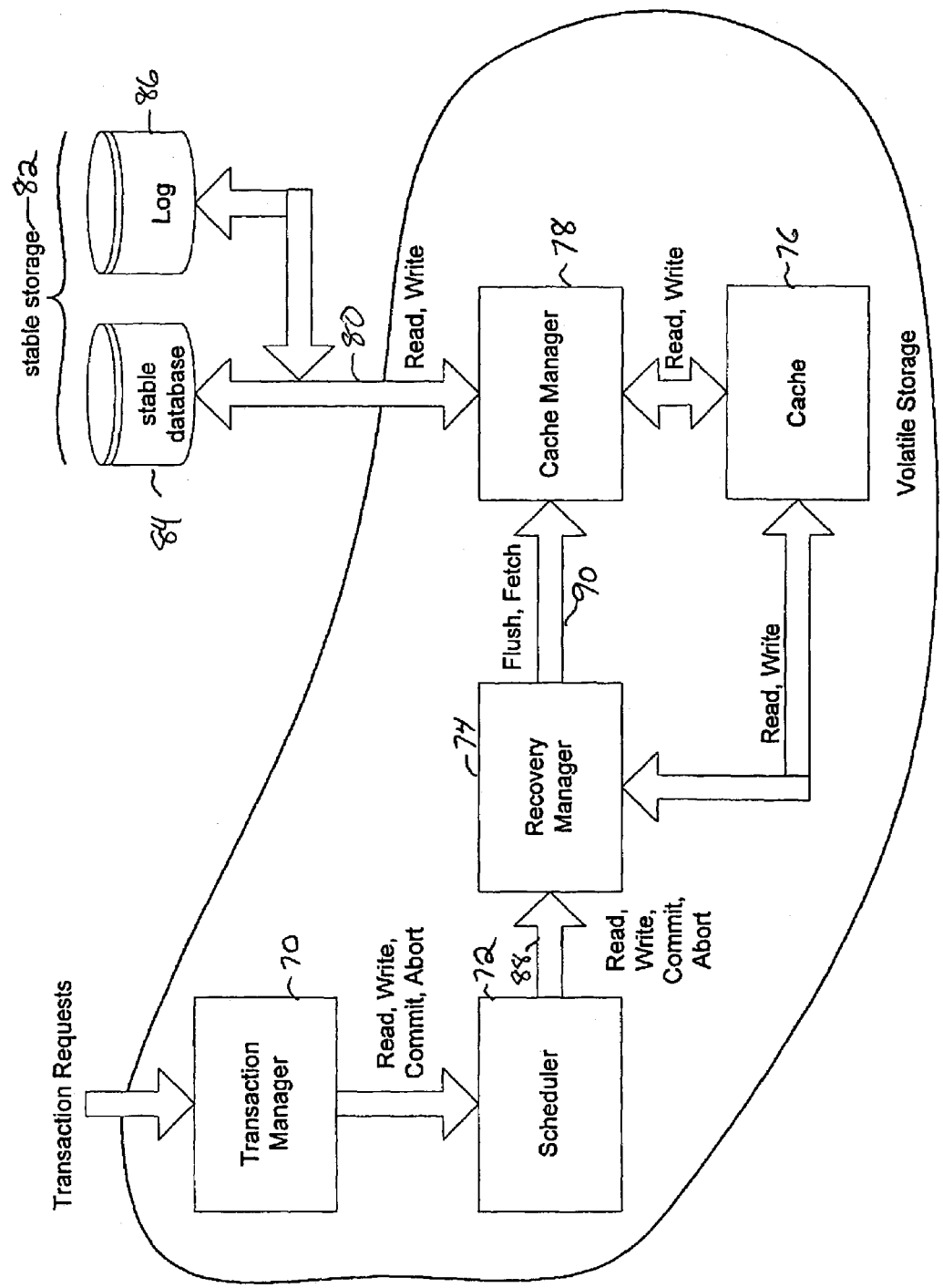
FIG. 2 is a diagram of a model of a transaction system.

One problem that is encountered is that data in stable storage cannot simply be moved or made available to the other clusters in the constellation. The reason is that, in a transaction processing system, much of the data is resident in volatile storage of the node or nodes processing the transaction. To illustrate why transaction updates are not in stable storage, FIG. 2 sets forth a diagram of a model of a transaction system. This model applies, in a general way, to a cluster. Shown in FIG. 2 are a transaction manager (TM) 70, a scheduler 72, a recovery manager (RYM) 74, cache storage (also called a buffer pool) 76 for a database, a cache manager (CM) 78, and an access point 80 to stable storage 82. (Sometimes, the scheduler 72 is considered to be included in the transaction manager 70). Stable storage 82 is usually implemented in the form of rotating magnetic disks and volatile storage is commonly implemented in the form of semiconductor memory. Stable storage 82 includes the data in the database tables 84 and data in the log storage 86.

The transaction manager 70 (TM) receives transaction requests from various processes in the system and decides which among the nodes of the cluster is to process the transaction. Once decided, the TM forwards the transaction to the scheduler 72 which has the job of controlling the concurrent execution of a plurality of transactions which may have been submitted to the TM. The scheduler 72 employs the recovery manager (RYM) 74 to carry out the operations that make up a transaction. These operations typically are, read, write, commit and abort 88. The RYM 74 receives the read, write, commit and abort requests 88 from the scheduler and assumes that, because the scheduler has taken care of the ordering of these operations, it can perform them in any order, though with the constraint that the operations be atomic. The cache manager (CM) 78 is configured to aid the RYM 74 in its tasks to perform the read, write, commit and abort operations. To perform these operations, the RYM issues fetch and flush messages 90 to the CM 78. A fetch request causes the CM to obtain data from the cache if the data is present in the cache, or from stable storage if the data is not present in the cache. If the data is fetched from stable storage 82, the data item is placed into the cache 76 for subsequent use. A flush request causes the CM 78 to write a data item to stable storage 82. This write is assumed to be atomic, which means that either the write executes in its entirety or not at all.

Briefly, the model of FIG. 2 operates as follows. The TM 70 receives a plurality of transactions for processing by the system. Each transaction usually includes a number of read and write operations on data items in the database. The scheduler 72 determines the order of these read and write operations for the plurality of transactions by means of a locking protocol, such as a two-phase locking protocol (2PL). The purpose of the locking protocol is to ensure a condition of serializability (and recoverability) which, in turn, is a condition for maintaining database consistency. The RYM 74 requests that the CM 78 perform the various flush and fetch operations necessary to complete the scheduled reads and writes. The CM 78 responds to the flush and fetch requests by performing reads and writes of the cache 76 or of the stable database 82. If the data sought by the RYM 74 is in the cache 76, it is provided from the cache 76. If the data sought by the RYM 74 is not in the cache 76, it is obtained from stable storage 82, provided to the RYM 74 and to the cache 76 for subsequent reference. If the cache 76 is full, then one of the occupied cache slots is chosen for replacement via a replacement algorithm such as Least Recently Used (LRU). If the chosen slot is dirty (has been written), then that slot is written to stable storage 82 and then updated with the new data. It is clear from these operations, that, at any point in time, the cache 76, which resides in volatile storage, may have many dirty slots belonging to many current transactions.

Besides the replacement algorithm of the cache, the cache must have a flushing policy, by which dirty slots in the cache are made persistent in stable storage. The most efficient flushing policy is called the "steal, no-force policy." This policy is intended to improve the speed of the transaction system by keeping data items in the cache as long as possible, thereby avoiding the much slower accesses to stable storage. The "steal" part of the cache flushing policy means that dirty slots in the cache are written to the stable database only when the slot is reused, even if transactions affecting the data item in the dirty slot are still active (neither committed nor aborted). The "no-force" part of the cache flushing policy says that a transaction can commit without flushing to the stable database any transaction updates that reside in the cache. Thus, while the "steal, no force" policy is efficient, it leaves some transaction updates in volatile storage and some updates in stable storage. If a failure occurs under these circumstances, data in volatile storage will be lost and data in stable storage will be inconsistent.

To use this cache flushing policy and still maintain the recoverability of the system after a failure, a log must be added to stable storage and a write-ahead logging (WAL)

policy must be adopted. The log contains a list of data items written by transactions in the order in which the writes occurred. The WAL policy guarantees that updates of a data item belonging to a committed transaction are saved in the log before the data item is overwritten by a transaction that is not committed. When a transaction writes a data item, the value of the item before the write is called the "before-image," and the value after the write is called the "after-image." It is clear that the WAL policy preserves "before-images" in the log.

It is also common for a transaction system to buffer or cache the write-ahead log itself to speed up the write-ahead logging process. To prevent a cached write-ahead log from violating the write-ahead rule, volume sequence numbers (VSNs) are adopted for entries in the log and entries in the cache. The CM makes sure that, before it flushes a cache slot to the stable database, all log entries up to the VSN in that cache slot have been written to the log. Thus, all "before-images" are preserved in the log before the stable database is overwritten, even when the log is cached, but it is clear that the stable database contains data values forced there by uncommitted transactions and is probably missing data values that are still in volatile storage.

The takeover plan in accordance with an embodiment of the present invention must deal with the inconsistent state of the stable database.

Another problem with a takeover plan for a failed cluster is that an operating cluster may have a very large transaction processing load. In fact, the cluster may be running at near full capacity. Moving the entire transaction workload of the failed cluster to one of the clusters in the constellation is not feasible.

Yet another problem with a takeover plan for a failed cluster is that database consistency must be preserved after the takeover. This means that, if the database, prior to the cluster failure, was consistent, nothing in the takeover plan makes the database inconsistent. In this context, a consistent database can be defined as one that meets some agreed upon consistency predicate. Normally, in the absence of a system failure, a database system preserves database consistency at the transaction level, which means that if a database was consistent before a transaction, it is consistent after the transaction. This level of consistency must continue after a cluster takeover. It is clear that to preserve transaction consistency, transactions must be scheduled according to some serial order or its equivalent. As noted above, it is the job of the scheduler in a transaction processing system to preserve consistency in the execution of transactions.

A transaction processing system, such as the cluster described above, can fail (become inoperable or inaccessible) in a variety of ways. In particular, a system failure of a node in a cluster can occur, a communication failure between clusters can occur, a transaction failure or media failure can occur. Communications failures within a cluster are assumed not to occur in this discussion. As used herein, a system failure of a node is a failure of the central processing unit, its memory, or the software executed by the processor. A media failure, such as a failure of volatile storage, is distinguished from a system failure. A cluster failure is a complete system failure of the cluster or a failure of communication between the cluster and other clusters in the constellation such that the cluster is isolated from the other clusters.

For purposes of the present discussion, it also assumed that cluster inoperability is always detectable and is caused by a system failure (processor-memory failure or software failure), as opposed to a failure of stable storage.

When a failure occurs, the RYM has the task of preserving consistency of the database during and after recovery of the system from the failure.

In above-mentioned model, the RYM 74 implements both an undo and a redo policy. The undo-redo policy of the RYM 74 is the direct result of the "no-force, steal" cache flushing policy. The undo policy relies on "before-images" in the log to backout or undo updates from transactions that are active at the time of failure. The redo policy relies on "after-images" in the log to update the stable database with updates for transactions that are known to be committed. The goal of recovery is to have the capability of creating a stable database having only data items from committed transactions.

It is best when performing an undo or redo operation to have stopping point in the log, prior to which the system need not concern itself. The contents of a typical log file entry are shown in FIG. 3. The log file typically includes update records 100, commit records 102, abort records 104, and checkpoint records 106, as shown. Not all types of records, of course, must be present for every transaction. The stopping point is one at which it can be guaranteed all data items in the database were written by committed transactions. Writing checkpoint records is the means by which this stopping point is created. In order to reduce the impact of checkpointing on performance, "fuzzy checkpointing" is preferred. In this scheme, instead of flushing all dirty cache slots to stable storage at a checkpoint, the system flushes dirty cache slots that have not been flushed since the previous checkpoint, thereby relying on the flushing policy of the cache to do most of the flushing work between checkpoints. "Fuzzy checkpointing" requires that the RYM go back to the penultimate checkpoint, at which it is guaranteed that data from committed transactions have been written to the stable database and data from aborted transactions have been undone.

Process Environment In the Cluster

Figure 4:
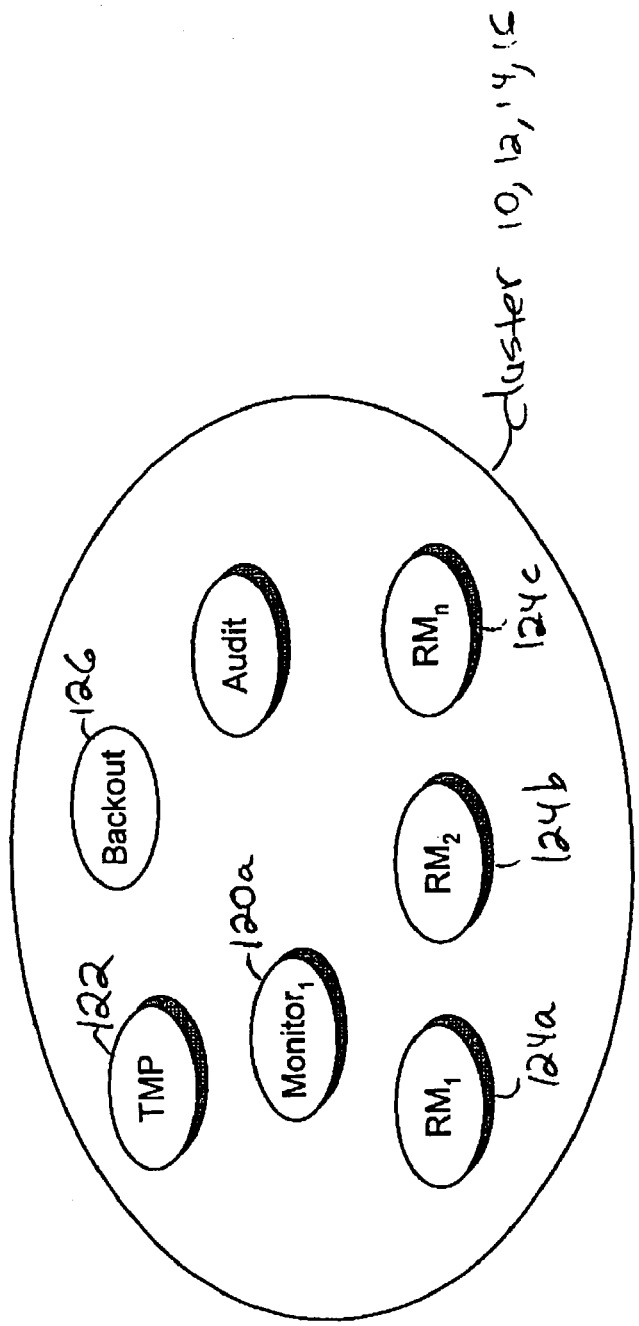
FIG. 4 is an illustration of the process environment.

FIG. 4 depicts a process environment for the cluster. The processes relevant to an embodiment of the invention include a local transaction manager (Local Monitor Process) 120*a*–c, a Distributed Transaction Manager pair 122, one or more Resource Manager Process pairs 124*a*–*c*, a Backout Process 126, and an Audit Process Pair 128 (also known as a Log Manager). The Local Management Process Pair 120*a* implements a two-phase commit protocol (2PC) among participants (RMs) in a local transaction. The Distributed Transaction Monitor Process Pairs implement a distributed two-phase commit protocol (D2PC) among participants in a distributed (or network) transaction. The Resource Manager Process Pairs 124*a*–*c* implement the Do-Redo-Undo protocol (thus the Resource Manager includes a RYM) for data items on a storage volume and includes the scheduler which performs the locking protocol to maintain serializability. A Resource Manager Pair 124*a*–*c* joins a transaction when requested by a transaction client and keeps track of the 2PC phase 1 and phase 2 activities of a transaction. Both processes of the Resource Manager Process pair are participants in the transaction. The primary process of the Resource Manager Pair performs a checkpoint operation to the backup process of the pair, so that the backup process can takeover for the primary process should a system failure occur on the processing unit hosting the primary process. The checkpoint operation includes sending a current list of transactions to the backup process. The Backout Process performs the undo operations if a transaction is to be aborted. The Audit Process Pair (Log Manager Pair) 128 performs the logging operation for a Resource Manager Pair 124*a*–*c*. Both the primary Resource Manager and the backup Resource Manager of a Resource Manager Pair send logging messages to a logging buffer managed by the Audit Process Pair 128. The Audit Process 128 writes the audit log buffer to stable storage when the buffer becomes full. As described above, because the audit log is buffered, volume sequence numbers (VSN) are used to help meet the undo and redo rules and to thereby insure database recovery. Because both the primary and backup Resource Managers write to the log buffer, multiple identical records may be present in the log.

The Resource Manager Pair 124a–c interacts with the data volume assigned to it. The data volumes for the several Resource Manager Pairs 124a–c of a cluster are preferably located in a storage farm called Enterprise Storage. This storage system is accessible by all nodes of each cluster in the constellation of clusters.

Figure 5:
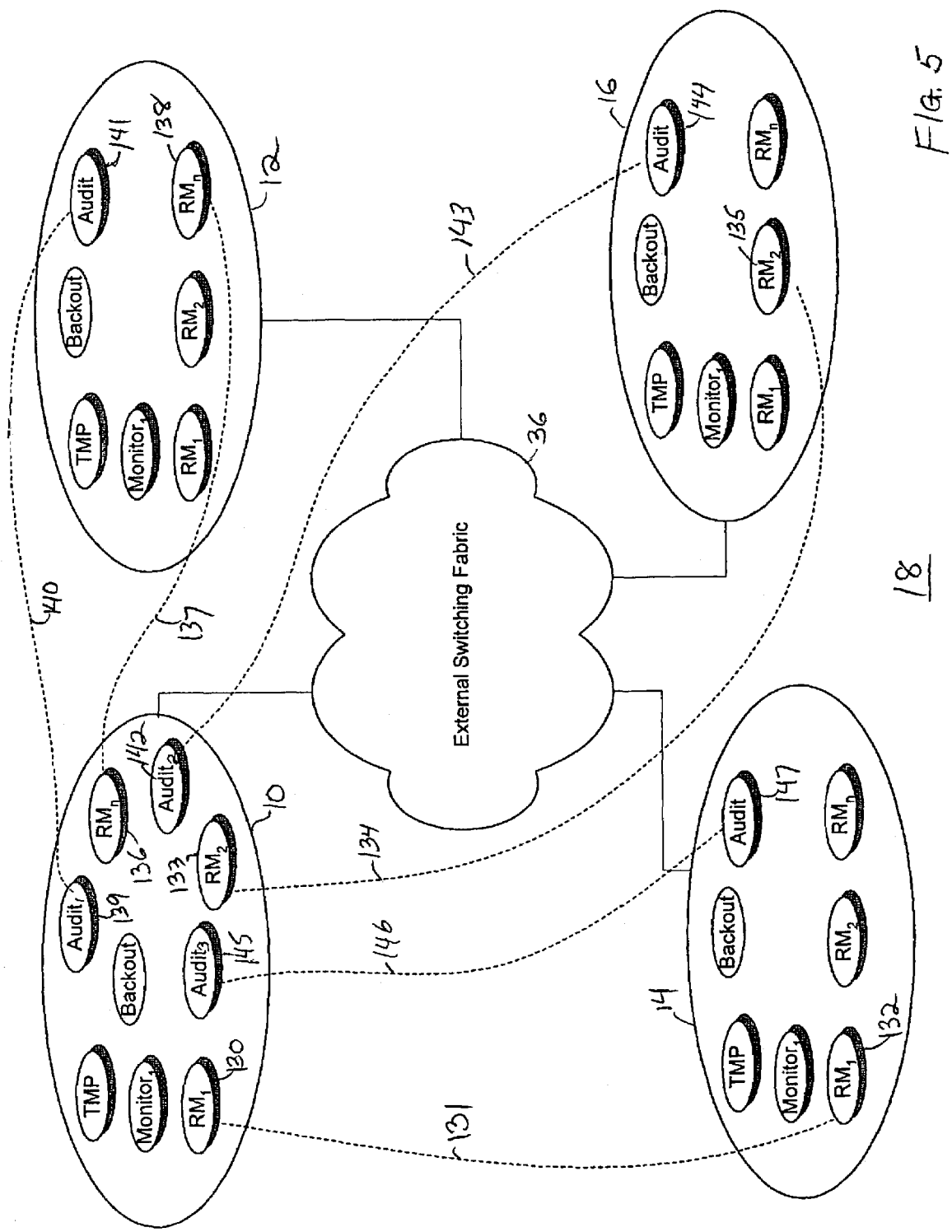
FIG. 5 illustrates the changes to the process environment in an embodiment of the present invention.

In accordance with an embodiment of the present invention, the above process environment of the cluster is altered. FIG. 5 shows the new process environment of the cluster. First, a Resource Manager Pair 132 that acts as a backup to a Resource Manager Pair 130 in the cluster 10 is added to at least one of the other clusters 14 in the constellation. The four Resource Managers of the two pairs 130, 132 are called a Process Quad. The processes included are called the first primary, first backup, second primary and second backup. Second, the log is segmented into multiple audit logs, called Auxiliary Audit Trails. An Auxiliary Audit Trail contains the updates for one or more volumes attached to the cluster. Additionally, a new level of checkpointing 131 occurs between the primary Resource Manager Pair 130 and the Backup Resource Manager Pair 132. This checkpointing 131 includes messages that flow from the Primary Pair 130 to the Backup pair 132 over the external network 36 that interconnects the clusters 10, 12, 14, 16 of the constellation 18. The result is that the Backup pair 132 has a complete transaction state and log data for the transactions affecting a node of the cluster that hosts the primary Resource Manager Pair 130. Similarly, a pair of resource manager process pairs 133, 135 is linked via 134 between clusters 10 and 16, and a pair of resource manager process pairs 136, 138 is linked via 137 clusters 10 and 12. A pair of audit process pairs 139, 141 is linked via 140 between clusters 10 and 12; a pair of audit process pairs 142, 144 is linked via 143 between clusters 10 and 16; and a pair of audit process pairs 145, 147 is linked via 146 between clusters 10 and 14. Each of these process pairs has checkpointing between the primary pair and the backup pair.

Log Storage Groups

Figure 6:
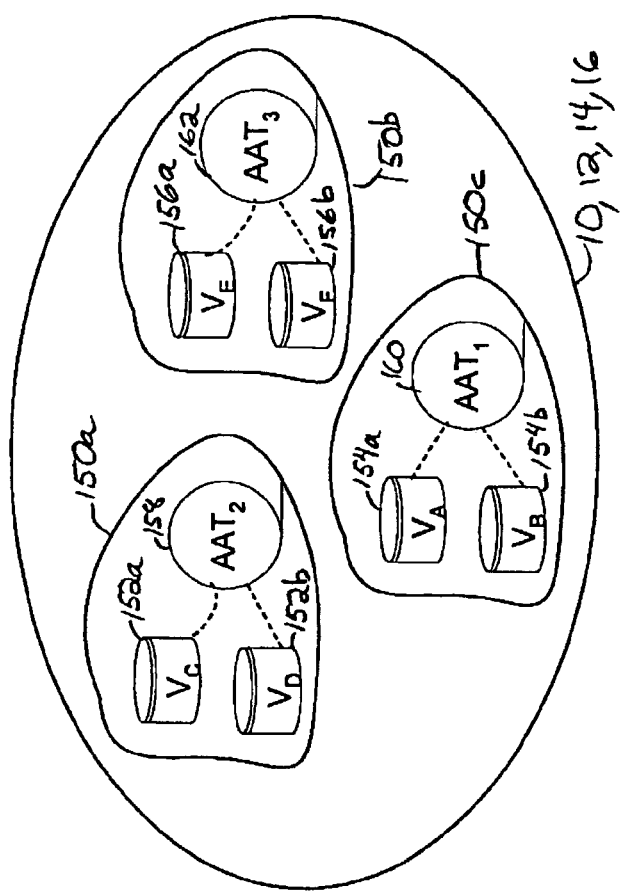
FIG. 6 illustrates a log storage group in an embodiment of the present invention.
Figure 7:
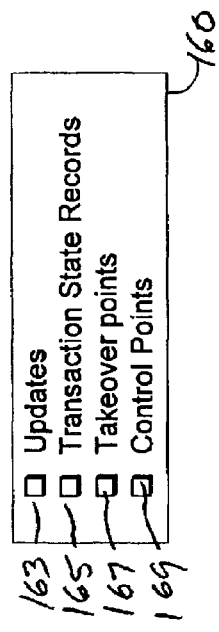
FIG. 7 illustrates an auxiliary audit trail in an embodiment of the present invention.
Figure 8:
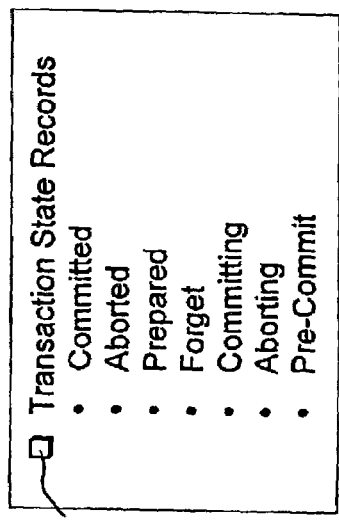
FIG. 8 sets forth a flow chart of the logging processes in an embodiment of the present invention.

A new entity, called a log storage group (LSG) is defined for the system. FIG. 6 illustrates a Log Storage Group 150a–c, which includes one or more disk volumes 152a–b, 154a–b, 156a–b, and an Auxiliary Audit Trail (AAT) 158–162 in which the one or more disk volumes record their log data. Typical records 160 in the Auxiliary Audit Trail are shown in FIG. 7. Entries include updates 163 to the database, transaction state records 165 from commit coordinators, takeover points 167 from commit coordinators, and control points 169 from the TMP (the distributed transaction monitor) process, as illustrated. The disk volumes and the Auxiliary Audit Trail are considered as a data unit. Each Auxiliary Audit Trail has only a subset of the transactions that are committing, i.e., only the transactions that are committing on the particular Audit Trail. When a flush occurs, only a particular Auxiliary Audit Trail is flushed to the stable database, making the flushing operation complete more quickly. In contrast, a Master Audit Trail (MAT) has all of the transaction state records, and only transaction state records. Typical entries in the Master Audit Trail are shown in FIG. 8. Entries in the MAT 170 include transaction state records 172 with values such as committed, aborted, prepared, forget, committing, aborting, and pre-commit, as illustrated. When a flush occurs, a commit write is performed during which the transaction state records for all committed transactions are written to the Master Audit Trail.

The creation and employment of Log Storage Groups helps to solve the problem that only a portion of the database data actually resides in the stable database. By maintaining the connection between a particular Auxiliary Audit Trail and the stable storage volumes that log to the particular Audit Trail, a complete set of data that is maintained in stable storage, provided the rules of undo and redo, stated above, are met. Thus, storage volumes that use a particular Auxiliary Audit Trail and that Audit Trail are considered to be an inseparable unit throughout the system, such that when a Log Storage Group is moved to another cluster, all data pertaining to the set of transactions, committed or flushed to the Auxiliary Audit, are present.

In the case where the transaction state records in the Auxiliary Audit Trail are not sufficient to determine the state of a transaction, the MAT 170 is consulted. This can occur because the transaction state information that is logged for a distributed transaction depends on the position of the participant to a transaction in the spanning tree of the distributed transaction. For example, if the participant is a leaf in the spanning tree, that participant may not know the transaction state of the transaction after a failure has occurred. However, the correct transaction state is always available in the Master Audit Trial, which is accessible by any node in a cluster. In particular, a parent taking part in a distributed transaction records for a committed transaction, a commit record, a committed record and a forget record. A child taking part in a distributed transaction records a prepared record and a forget record if the transaction is committed and a node between a parent and a child records a committed record and a forgotten record. Additionally, whenever a child fails in the prepared state, the child node returns in the prepared state and has to resolve the transaction state as either committed or aborted according to the 2PC protocol. In a presumed abort protocol, if the child cannot resolve the transaction, it presumes that it is aborted. If the child asks the parent about the transaction, the parent must remember that the transaction was committed (if it was), until all of the children of the parent are notified. After all of the children in the transaction know the state of the transaction, the parent can then write a forgotten record and forget the transaction.

In accordance with an embodiment of the present invention, it is preferred that there be multiple Auxiliary Audit Trails, perhaps as many as 30 to 50 Auxiliary Audit Trails for a cluster. This allows for a multiplicity of Log Storage Groups that can be distributed to the other clusters in a way that balances the load of the failed cluster somewhat evenly over the remaining clusters in the constellation. By this means the problem of handling the load of the inoperable or inaccessible cluster is addressed without seriously impacting the loads on the remaining clusters.

However, the distribution of multiple Log Storage Groups over the remaining clusters in a constellation is not the complete solution to handing a cluster failure. The takeover of the inoperable or isolated cluster's load, must be done in a way that preserves database consistency, as described above.

Figure 9A:
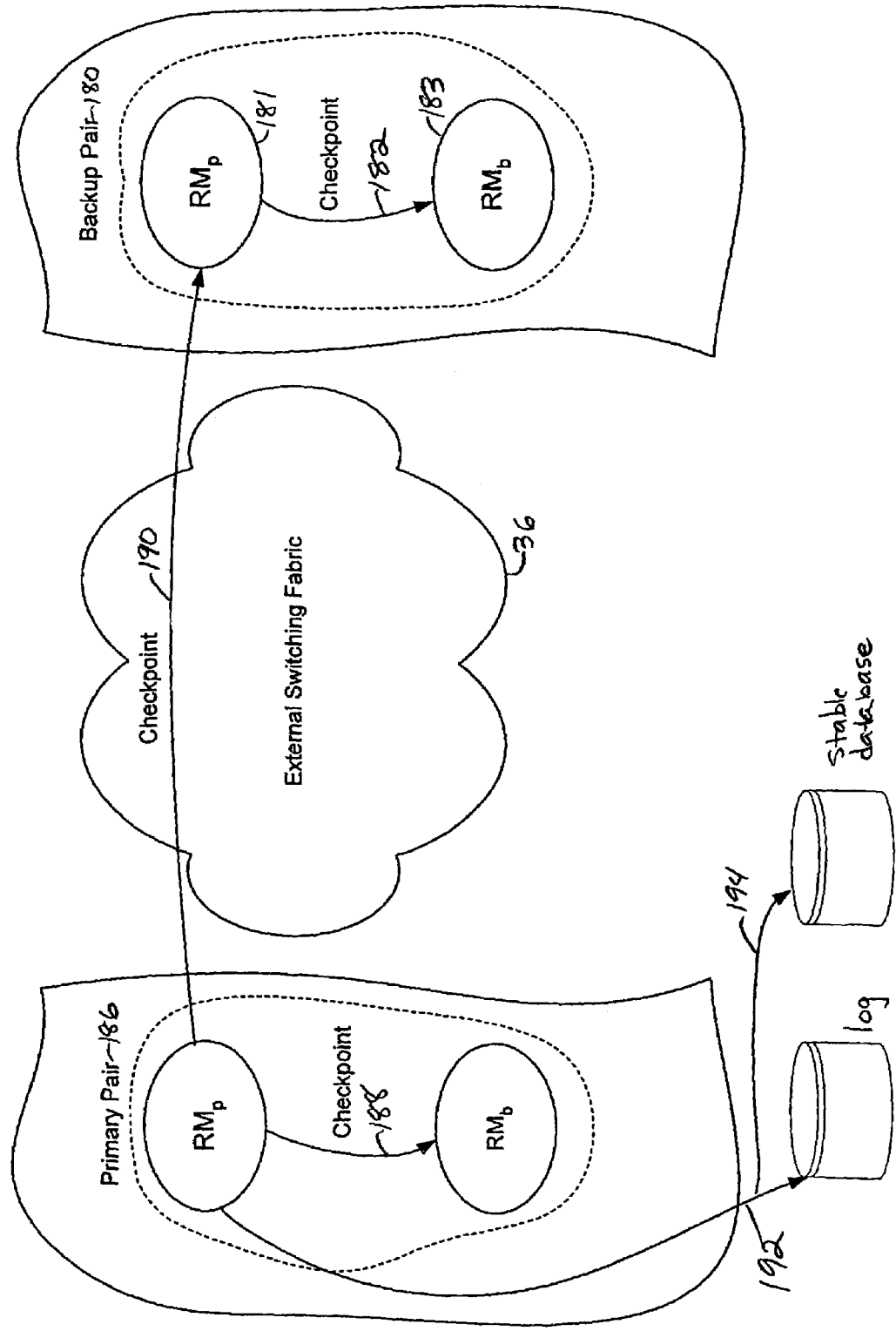
FIGS. 9A–B show the checkpointing in accordance with an embodiment of the present invention, depending on whether communications are functioning between clusters.

There are three cases to consider in regard to database consistency. The first case is one in which communications between the primary process pair and the backup process pair have not suffered a failure, as illustrated in FIG. 9A. This means that the backup primary process pair 181 has been checkpointing 190 the activity of the primary process pair 186 such that the backup pair 180 has its (the primary process pair's) buffer cache and normal transaction processing can continue with the backup pair 180 now acting as the primary process pair. The checkpointing sequence that makes this possible is (a) checkpointing ahead to the primary backup process (CAB) 188 in FIG. 9A, (b) checkpointing ahead to the backup process pair (over the network with a flag cp_flag in the Audit Trail that indicates communications are operational) (CANB) 190, (c) writing ahead to the log (WAL) 192, and then (d) writing to the storage volume (WDV) 194. In the CANB, step 190, the audit buffer (which is periodically written to the log) is checkpointed 190 to the backup process pair so that the backup process pair forms a correct version of the Audit Trail from the audit buffer it receives. Also, because of the presence of an audit buffer, volume sequence numbers (VSNs) are used, as described above, for each of the cache blocks to help keep track of the progress of the audit buffer writes to the Auxiliary Audit Trail.

Figure 10A:
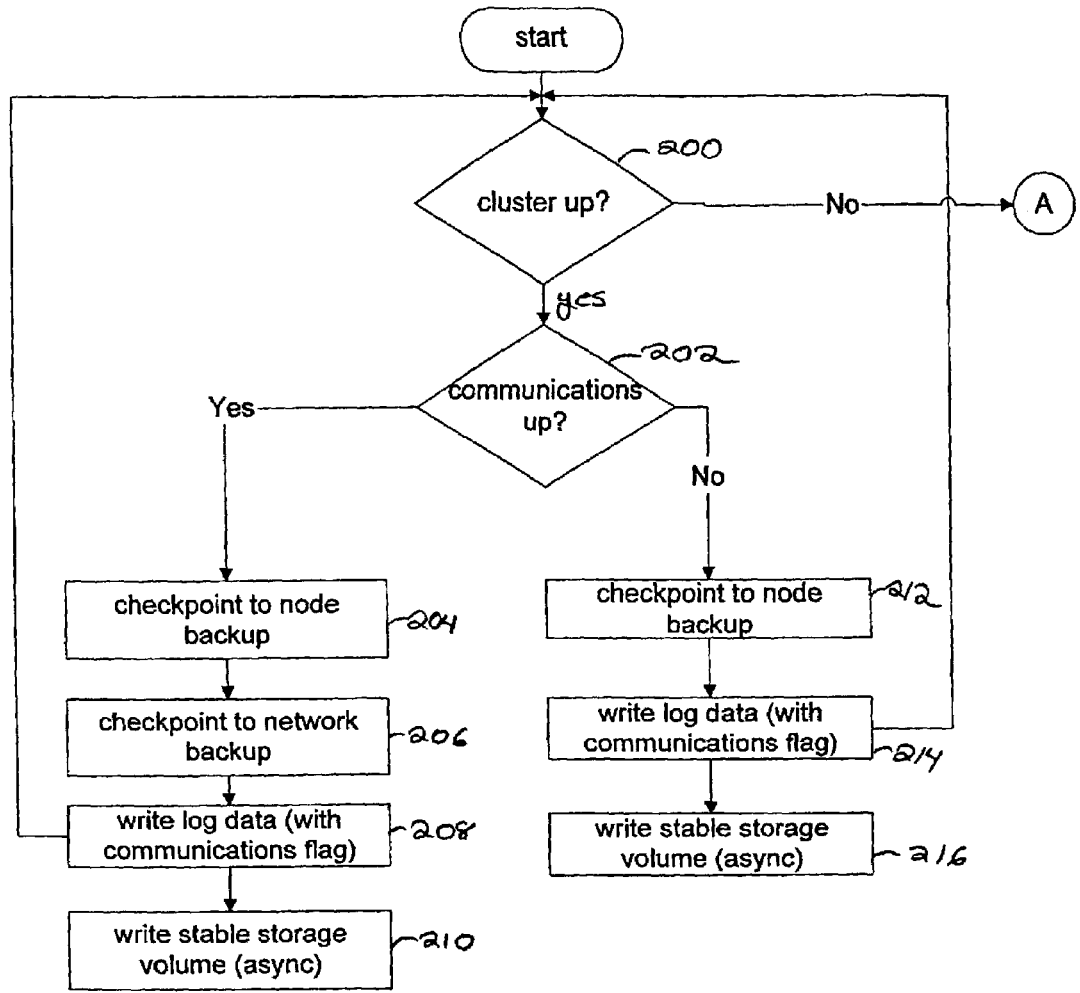
FIGS. 10A–C set forth a flow chart of the take over process in an embodiment of the present invention.

The flow chart in FIG. 10A illustrates the steps involved. If the cluster and communications are operational, as determined by steps 200, 202, then a checkpoint record is sent to the node backup process in step 204 and a checkpoint record is sent to the network backup process in step 206. The Audit Trail for the volume involved is then written and the communications flag is included, in step 208. In step 210, the stable database is written. This write occurs asynchronously, i.e., whenever an update to stable storage is scheduled by the system.

This sequence (CAB, CANB, WAL, WDV) thus guarantees that the backup process pair can takeover for a particular storage volume in the failed cluster. As mentioned, the cp_flag is included in the CANB-part of the sequence to indicate the state of communications between the node in the operational cluster and the node in the inoperable or inaccessible cluster.

Figure 9B:
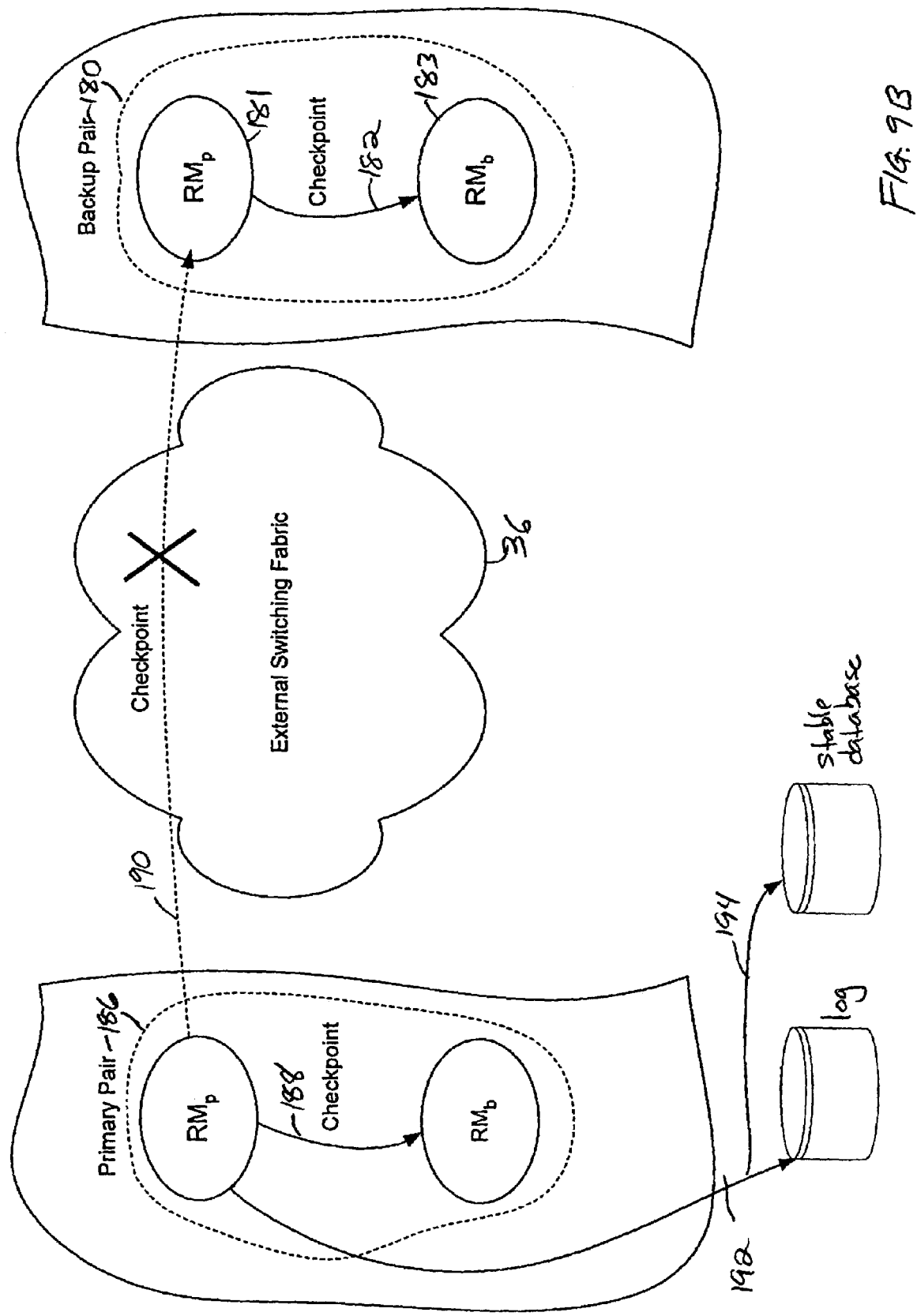

The second case to consider is one in which communications have failed between the primary process pair and the backup process pair prior to a cluster failure, as illustrated in FIG. 9B. In this case, the backup process pair 180, upon takeover, can determine that the Auxiliary Audit Trail it has is not current, i.e., some checkpoints have been missed. However, the last good checkpoint is known because of the flag in the Audit Trail. Prior to the communications failure, the checkpointing sequence was CAB 188, CANB 190, WAL 192, WDV 194. However, subsequent to the communications failure, the checkpointing sequence changes to CAB 188, WAL 192. This guarantees that the Auxiliary Audit Trail for the primary process pair has current information in it. FIG. 10A illustrates the steps involved. In step 212, if communications are not operational as determined by step 202, a checkpoint is made to the node backup and the Audit Trail is updated including the communications flag, in step 214. Asynchronously, in step 216, stable storage is updated.

Figure 10B:
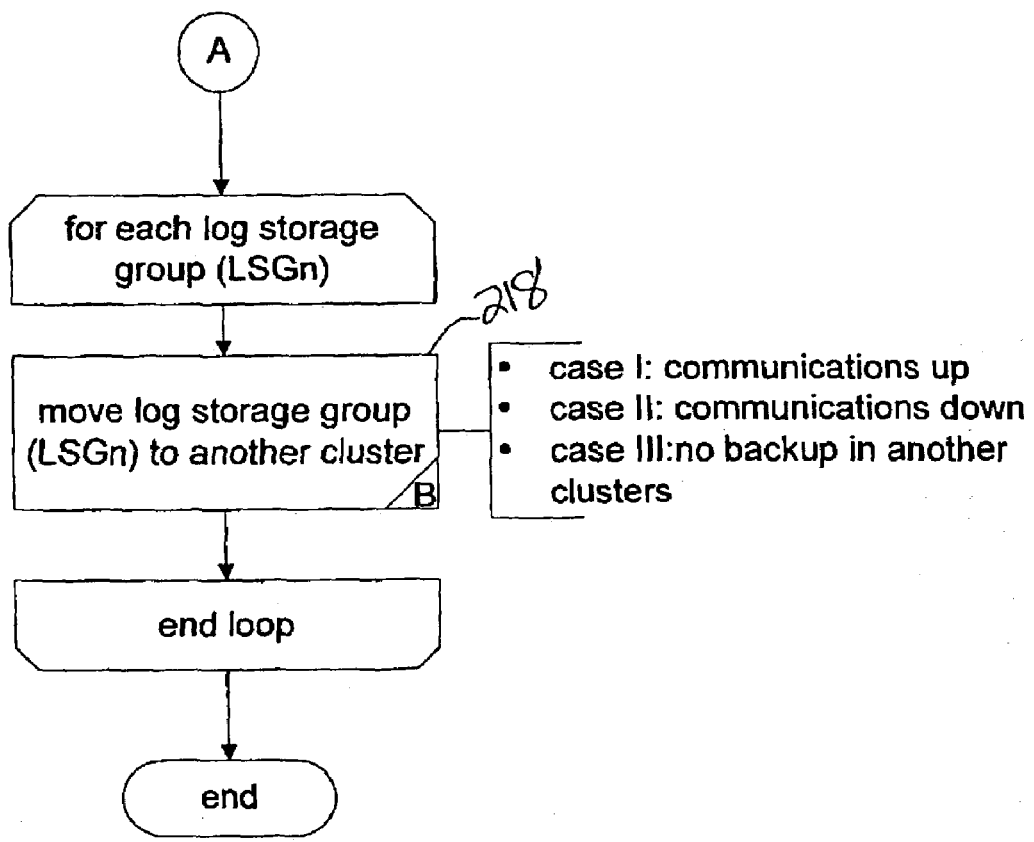
Figure 10C:
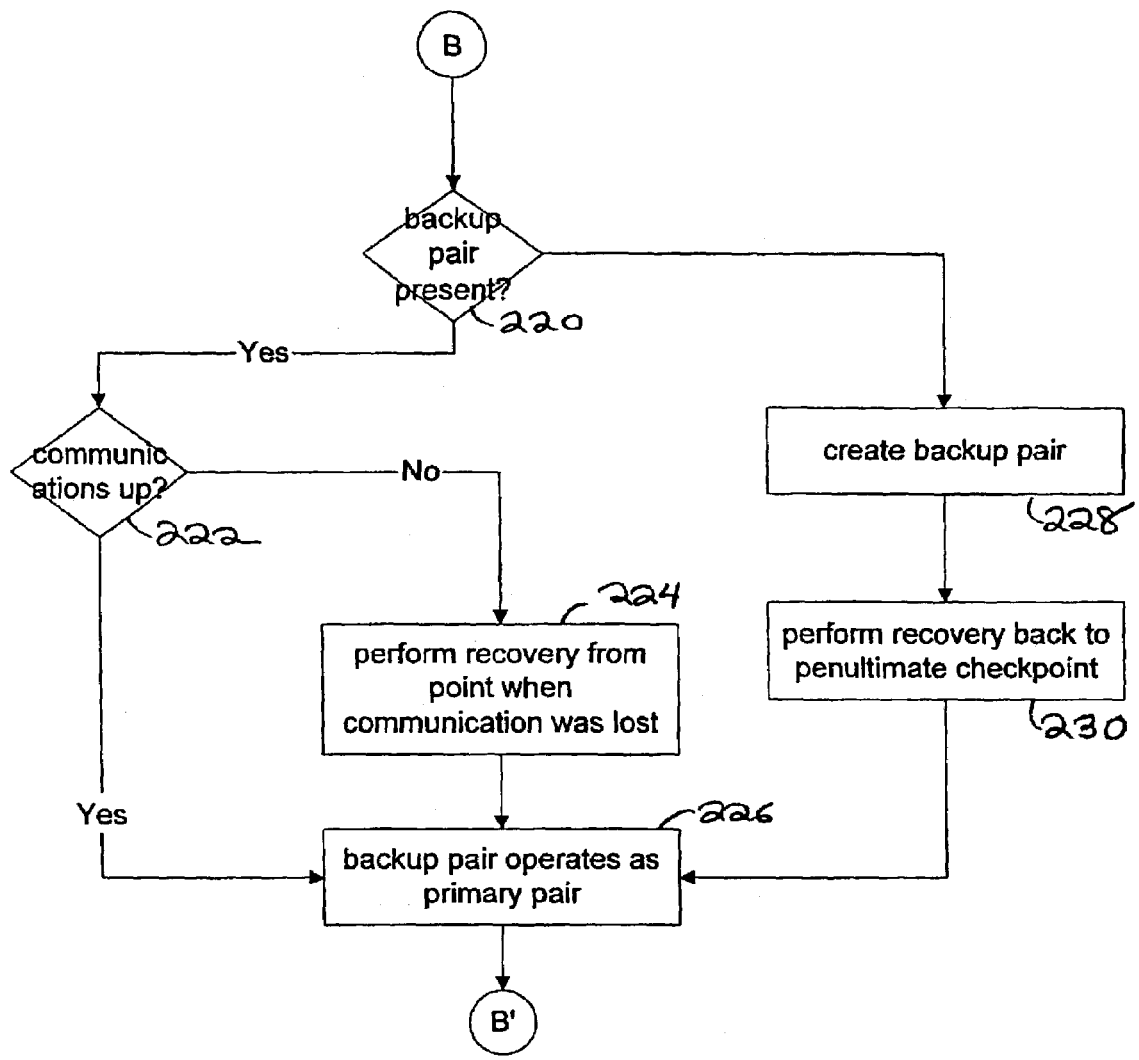

Upon taking over, when a cluster failure occurs, the backup process pair obtains the Auxiliary Audit Trail for the Log Storage Group from Enterprise storage and performs a redo operation and undo operation based on the last good checkpoint and the updates in the Auxiliary Audit Trail for the Log Storage Group. Performing the redo and undo operations prepares the cache of the backup process pair 180 so that transaction processing can continue in a timely manner on the backup process pair 180. FIGS. 10B and 10C illustrate the steps of this process. In FIG. 10B, if a failure has been detected in step 200 (FIG. 10A), each log storage group of the cluster is moved to another cluster, in step 218. In FIG. 10C, assuming that the backup pair is present (as determined in step 220), the move involves determining that communications were not operational, in step 222, and performing a recovery process back to the point in the Audit Trail when communications were operational, in step 224, after which the backup pair operates as the primary pair for the workload in step 226.

The third case to consider is one in which there is no backup process pair, as determined in step 220, in FIG. 10C. In this case, a new process pair is created, in step 228, on a node in an operating cluster and a complete recovery is performed, in step 230, based on the Log Storage Group of the node in the failed cluster. Reading the Audit Trail in the Log Storage Group, the node hosting the new process pair is setup with a cache state that is consistent with the Audit Trail, the cache being populated from the Audit Trail. Starting at the end, the Audit Trial is traversed backwards undoing all of the information that was sent to the cache until the point at which the transaction was begun is reached, thereby backing out active transactions. For transactions whose state is unclear in the Audit Trail, because the Audit Trail has only pre-commit records in it, the recovery procedure must examine the Master Audit Trail to determine the state of the transaction in question. As described above, the Master Audit Trail is available for read-only access in Enterprise storage to any number of nodes in the operational clusters.

Figure 11:
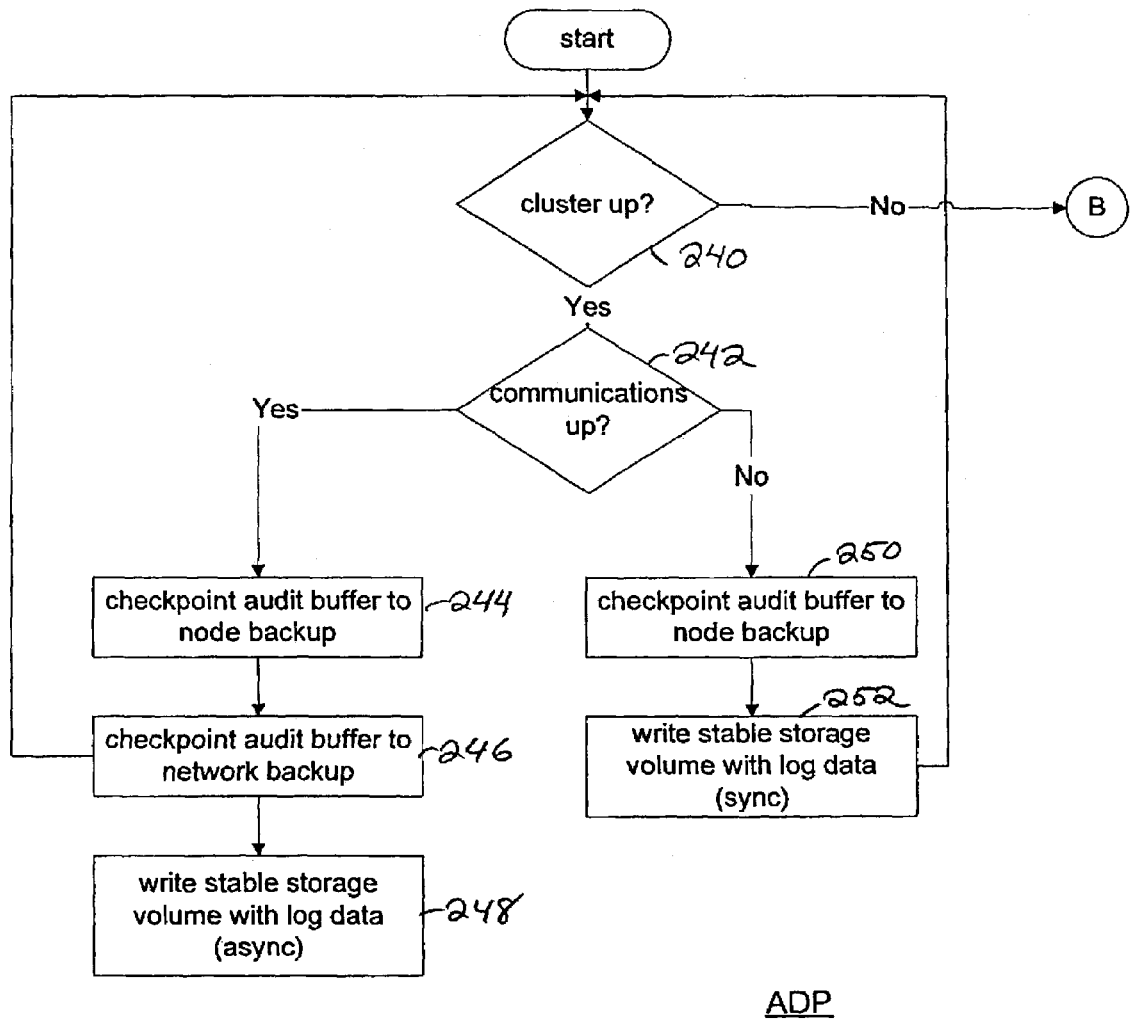
FIG. 11 sets forth a flow chart for the audit buffer checkpointing in an embodiment of the present invention.

A final case must be considered. This is the case of the failure of the Audit Process. As described above, The process environment in the cluster includes an Audit Process Pair that performs the logging operation for the Resource Manager Pair, each process of which sends logging messages to a logging buffer managed by the Audit Process Pair. Referring to FIG. 5, the Audit Process Pair 140 has a backup process pair 142 in a node of a cluster separate from the cluster hosting the primary Audit Process Pair and checkpointing 144 occurs between the primary Audit Process Pair 140 and the backup Audit Process Pair 142. Under normal circumstances, with network communications between clusters operational and no cluster inoperability as determined in steps 240 and 242 of FIG. 11, the primary Audit Process pair performs a Checkpoint Ahead to the Local Backup (CAB) in step 244, a Checkpoint Ahead 144 to the Network Backup (CANB) 246, and a loop until the audit buffer is flushed to disk in step 248. There is no performance penalty to performing a checkpoint to the backup Audit Process Pair 142. However, if network communications between the primary Audit Process Pair 140 and the backup Audit Process Pair 142 are non-operational as determined in step 242, then a flag is recorded in the Audit Trail. The flag indicates that the backup Audit Process Pair 142 checkpoints are not consistent with the primary Audit Process Pair 140 checkpoints. When this occurs, the primary Audit Process log buffer is checkpointed to the backup process in step 250 and the buffer is forced to stable storage, in step 252, on every update to the log buffer, essentially reverting to a write-through operation. This guarantees that the Audit Trail created by the primary Audit Process Pair is up to date. The sequence, when a failure occurs, is to Checkpoint Ahead to the local Backup Process (CAB) (step 250) and to perform a write through operation (in step 252) before replying that the flush is completed.

In summary, to handle the case of a cluster failure in a constellation of clusters without the need for a standby cluster, a plurality of Log Storage groups present on the failed cluster is distributed to other clusters in the constellation. Nodes in the operating clusters receiving a Log Storage Group may perform a recovery procedure depending whether communications over the network between the operating cluster and the inoperable or inaccessible cluster were still operational at the time of failure. If communications were down, a partial recovery occurs back to the last known consistent checkpoint. If there was no backup process pair on a cluster accepting the Log Storage Group, then a process pair is created and a full recovery procedure is performed. The result of the recovery procedure is that the cache of the node hosting the process pair taking over is made consistent with the Audit Trail, so that transaction processing can continue without substantial delay. No attempt is made to flush all updates in the Audit Trail to the stable database, because this would lengthen the time for the system to takeover the inoperable or inaccessible cluster. A backup of the Audit Trail is also created so that the Audit Trail is always available in case a recovery is required. In this way, a takeover of a failed cluster is possible without complete standby cluster, by using the facilities of the other operational clusters in the constellation.

As described above, a locking protocol is commonly used to guarantee the serializability and recovery of the transaction system. One such locking protocol is the two-phase protocol. Briefly, the two-phase locking operates as follows. A read or write operation on a particular data item such as a table row may need to be locked by a running transaction. When the scheduler receives a read or write operation on a data item, the scheduler determines whether any other transaction has locked the data item. If not, it sets the lock on the data item. If a lock on the item is already held, then the transaction waits until the lock is released, and when released acquires the lock. This is the acquisition phase of the locking protocol.

Once the lock on a data item is acquired, the lock cannot be released until the operation on the data item has been completed. This assures that the data operations are performed in the order determined by the scheduler. After a lock is released by a transaction, the transaction cannot obtain any more locks on any data items. This is the releasing phase of the locking protocol.

A common variation of the above to require that the scheduler release all of the transactions locks together when the transaction terminates, i.e., either after an abort or a commit.

Commonly, locks for a data item are kept in a lock table. To set a lock, an entry is added to the table, where the entry includes the transaction id, the data item and a "read" or "write" indicator. In conjunction with the lock table, a queue is maintained, the entries of which identify a request by a transaction for a lock on a data item. When a lock is released, any queue entries that are not blocked, are entered into the table.

It is common in a database system to have locks for different types of data items, such as files and table records. If a transaction begins with locks on records and the number of these locks exceeds a given number of these, then the transaction is granted a file lock. Additionally, at times it may become necessary to lock the entire database. Clearly, the latter is undesirable because the database is completely inaccessible. Furthermore, if the database is locked after a cluster takeover operation occurs for the duration of the takeover operation, access to the database is blocked for a long period of time. For many large, critical databases this is unacceptable.

It is clear from the above, that if a cluster takeover occurs, many transactions that are active may have many record (i.e., high granularity locks) locks set. In accordance with an embodiment of the present invention in which the cache of the node hosting the process pair taking over for the failed or inoperative cluster is restored, it is desirable to remove low granularity locks, such as volume and file locks, and reinstate high-granularity locks, such as record locks, to be consistent with the processing state reflected in the restored cache. The alternative would be to abort all active transactions, which is a costly action, because many of the transactions may have reached a state (such as a prepared state in a three-phase commit protocol) in which they may be committed or at least rendered non-blocking to other transactions. By reinstating the record locks that were present, processing of some of the active transactions can continue in the midst of transactions whose states are being resolved, without substantial interruption to the users and without jeopardizing the consistency of the database.

Figure 12:
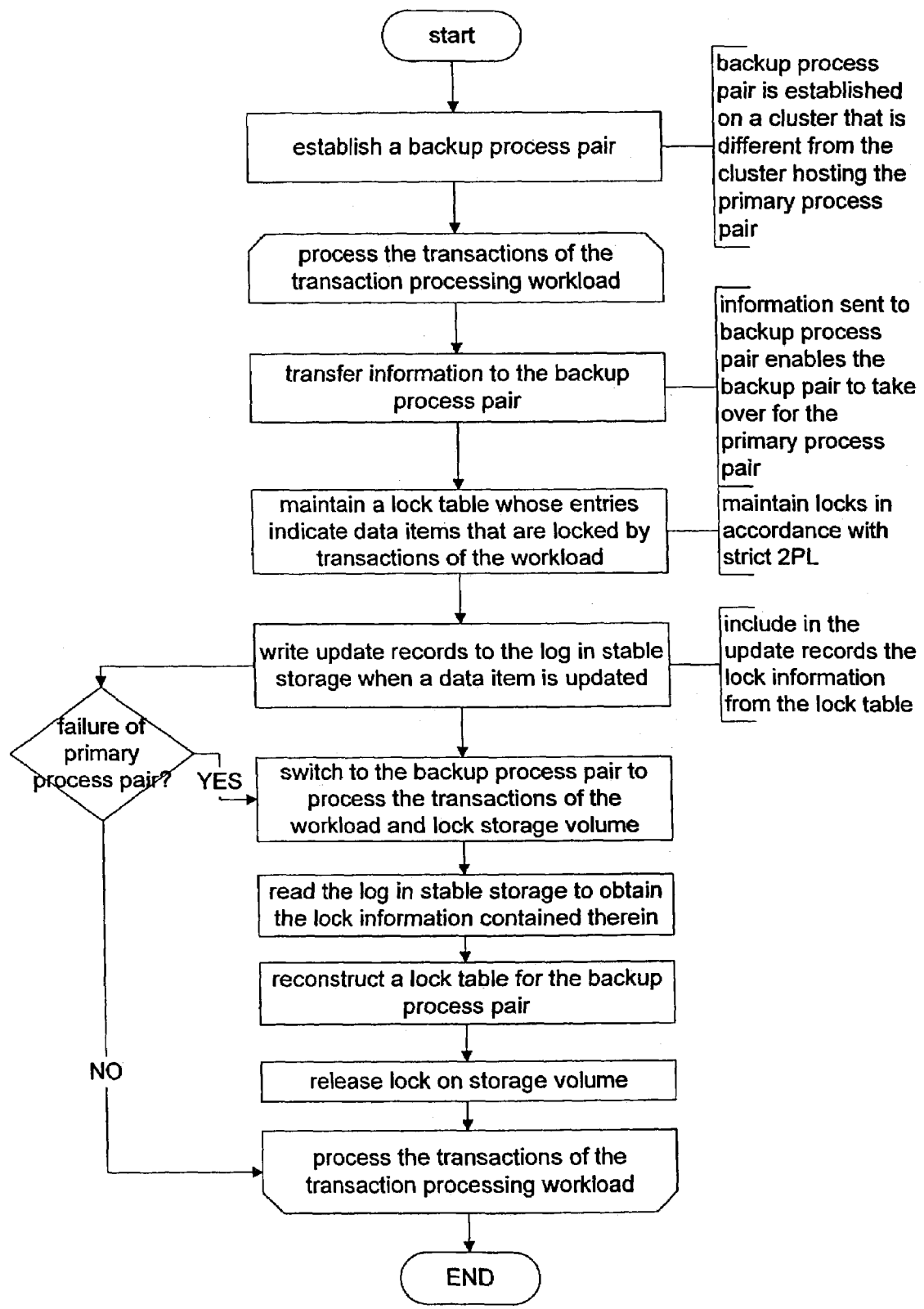
FIG. 12 sets forth a flow chart of the lock reinstatement process in an embodiment of the present invention.

Referring to FIG. 12, in the process environment in accordance with an embodiment of the present invention, a backup process pair is established, in step 300, for the primary process pair and while processing the transaction workload, as represented by loop 302, the primary process pair transfers information to the backup pair, in step 304, as described above, so that the backup pair can takeover for the primary pair. Also, during the processing of the workload, a lock table is maintained in step 306, the entries of which indicate data items that are locked by active transactions. Often the locking protocol observed is strict two-phase locking in which the locks that are acquired by active transactions are only released when the final state, commit or abort, of the transaction is known. The primary pair places the locking information into an audit buffer which it sends to the backup resource manager, as well as to the log manager and causes the audit buffers to be written to the log, in step 308. These locks are preferably update locks (i.e., write locks). The backup resource manager of the primary pair can extract the update lock information from the audit buffers.

In the changed process environment referred to above, when there is a failure, as determined in step 310, of the primary process pair and the backup process pair takes over, in step 312, the storage volume connected to the primary pair is locked and the backup pair extracts the update lock information from the log records, in step 316. In order to place a limit on how much of the log the second backup process must read, control points are written periodically to the log. Each control point contains the locks that were not written since before the previous control point. Between the checkpoints, the log contains update records that include update locks. Thus, the update records between the second to last checkpoint and the last checkpoint and the last checkpoint are all that must be read to reinstate locks upon a cluster takeover. Everything prior to the second to last checkpoint is not locked, if strict two-phase locking is observed.

At the beginning of the takeover process, there is a lock on the entire database and on all of the data volumes, as indicated in step 312. Then, as the takeover process proceeds, the log record is read, in step 314, and the lock table is reconstructed, in step 316, for the backup process pair. As each data volume involved has its locks reestablished, the lock for the entire volume is released and the lock on the database is released, in step 318. Then, new transactions can start and workload processing can continue while all transactions which must abort due to being caught active during the crash are backed out. A list of prepared transactions awaiting resolution need not be resolved before new transaction processing continues. Recovery time for the system is about 30 seconds.

A switch should be used to enable fast crash recovery. The switch is turned off if users with a high number of long running or batch transactions holding many locks on a particular resource manager wish to take the option of not logging them in the control points.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of transferring a transaction processing workload of a primary process pair, the primary process pair having access to a stable storage volume for storing data items and a sequential log for storing transaction processing updates to data items, the method comprising:

establishing a backup process pair for the primary process pair;

while processing the transaction workload of the primary processing pair, transferring information from the primary process pair to the backup process pair, such that the backup process pair can takeover the workload of the primary processing pair if the primary process pair is not available to process the workload;

maintaining a lock table whose entries indicate data items of the storage volume that are locked by transactions of the transaction processing workload;

upon updating a data item in stable storage, writing update records to a log on the stable storage volume, the update records in the log including lock information relating to the update record;

upon a failure of the primary process pair, switching to the backup process pair for transaction processing of the workload of the primary process pair and locking the stable storage volume;

reading the log in stable storage to obtain the lock information contained therein;

reconstructing a lock table for the backup process pair from the lock information read from the log;

releasing the lock on the stable storage volume so that processing of the transaction processing workload of the primary process pair is continued by the backup process pair; and continuing the processing of the transaction workload by the backup process pair using the reconstructed lock table.

2. A method of transferring a transaction processing workload, as recited in claim 1, wherein the step of maintaining a lock table includes maintaining the lock table entries in accordance with a two-phase locking protocol in which any locks acquired by a transaction are released when the transaction either aborts or commits.

3. A method of transferring a transaction processing workload, as recited in claim 1, further comprising, while processing the transaction workload of the primary processing pair, writing a control point to the log on stable storage, the control point including locks on data items that were not written to the log prior to the control point;

wherein the log has an indicator marking the end of the log; and wherein the step of reading the log in stable storage to obtain the lock information includes reading the log starting at the end and traversing back to the second to the last control point.

4. A method of transferring a transaction processing workload, as recited in claim 3, further comprising testing a switch to determine whether to include locks in the control point before writing the control point to stable storage.

5. A method of transferring a transaction processing workload, as recited in claim 1, wherein the data items are table records and the locks are record locks.

6. A method of transferring a transaction processing workload, as recited in claim 1, wherein the workload includes a transaction processed in accordance with a three-phase commit protocol, and the transaction is in a prepared state when the failure of the primary process occurs;

wherein the step of continuing the processing of the transaction workload by the backup process pair includes processing the transaction workload by the backup process pair while the transaction in the prepared state determines whether it is committed or aborted.

7. A fault tolerant constellation of computing clusters, the constellation comprising:

a plurality of stable storage volumes for storing database information, one or more of the storage volumes being organized into a group;

a plurality of log storage volumes, each for storing a transaction log, one log storage volume being associated with each group of stable storage volumes to form a log storage group;

a plurality of computing clusters, each computing cluster including one or more computing nodes, at least one computing node in one cluster having a primary process pair for performing work on behalf of one or more transactions by accessing a log storage group and an audit process pair for writing audit information to the log storage volume of the log storage group, the audit information including entries from a lock table, the entries indicating data items of the storage volume that are locked by transactions whose work is being performed by the primary process pair, and at least one computing node in another cluster having a backup process pair for taking over the work of said primary process pair by accessing the log storage group used by said primary process pair, if said primary process pair is non-operational, wherein taking over the work of the primary process pair includes reconstructing the lock table from the lock entries in the audit information such that work on behalf of a transaction can continue without risk of database inconsistency; and a network that interconnects the plurality of clusters, the stable storage volumes and log storage volumes such that any of the clusters can access any of the storage volumes.

* * * * *

UNITED STATES PATENT AND TRADEMARK OFFICE
CERTIFICATE OF CORRECTION

| | | |
|---|---|---|
| PATENT NO. | : 7,100,076 B2 | Page 1 of 1 |
| APPLICATION NO. | : 10/435115 | |
| DATED | : August 29, 2006 | |
| INVENTOR(S) | : Charles S. Johnson et al. | |

It is certified that error appears in the above-identified patent and that said Letters Patent is hereby corrected as shown below:

On the Title Pg. Item (75), in "Inventors", line 5, delete "Sang-Sheng Tung" and insert -- Shang-Sheng Tung --, therefor.

Signed and Sealed this

Twenty-eighth Day of July, 2009

JOHN DOLL
*Acting Director of the United States Patent and Trademark Office*